March 19, 1957    R. A. SMITH ET AL    2,785,729
HEAT SEALING THERMOPLASTIC POLYMERS
Filed May 3, 1954
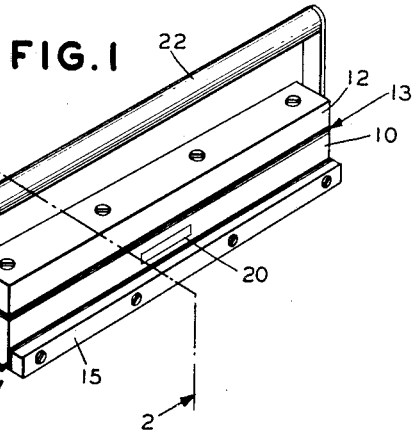
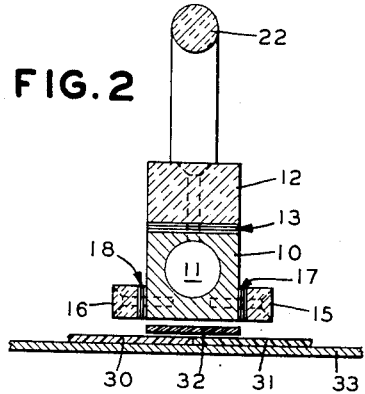
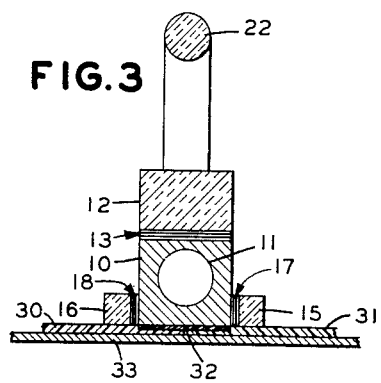
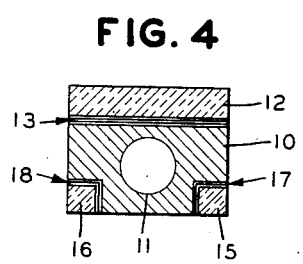
INVENTORS
RICHARD A. SMITH
BY FRED WILLIAM WEST
ATTORNEYS

United States Patent Office 2,785,729
Patented Mar. 19, 1957

2,785,729

HEAT SEALING THERMOPLASTIC POLYMERS

Richard A. Smith, Cornwall-on-the-Hudson, N. Y., and Fred W. West, Ridgefield, N. J., assignors to The M. W. Kellogg Company, Jersey City, N. J., a corporation of Delaware Application May 3, 1954, Serial No. 427,245

3 Claims. (Cl. 154—42)

This invention relates to a method and apparatus for sealing thermoplastic materials. In one of its more particular aspects, this invention relates to an apparatus and a method for sealing polytrifluorochloroethylene polymers.

In many of the applications where thermoplastic materials, such as polytrifluorochloroethylene, are used, the material must be sealed or joined by some suitable means. However, heat-sealing of these materials presents a distinct problem since the thermoplastic material tends to flow from under the hot platen. For example, in hot-iron sealing polytrifluorochloroethylene polymers, the area at the seam thins out thereby producing a weak point in the film. The material flowing from under the hot platen often forms a thickened section immediately adjacent to the seam. From this point outward "bleeding" takes place—this is distortion of the film and adhesion at irregular points causing weakness and poor appearance.

It is an object of this invention to provide an apparatus for heat-sealing thermoplastic polymers, which apparatus will prevent flow of the thermoplastic material adjacent at the seam.

It is another object of this invention to provide a method for sealing thermoplastic materials without weakening the material.

It is one of the more particular objects of this invention to provide a process and an apparatus for sealing polytrifluorochloroethylene films, sheets, and laminates.

Various other objects and advantages will become apparent on reading the accompanying description and disclosure.

Generally, the above objects are accomplished by employing a heated platen in conjunction with an insulating material. The heated platen acts to soften and fuse the thermoplastic, while the insulated material maintains the adjacent thermoplastic material at a temperature below softening temperature and also serves to hold the thermoplastic material adjacent to the heated material in place. The insulating material bearing on the cooler plastic prevents excessive pressures beyond those necessary to cause the desired flow. In other words the seam is molded between the cold plastic sections, the relatively cold insulating sections and the hot platen.

The heat-sealing portions of the above described apparatus may comprise any suitable heat-conductor, such as copper, aluminum, iron, etc. The heat-sealing member may be heated by any convenient method. For example, the heat-sealing element may be brought to temperature by means of a dielectric field or preferably by the use of a heating element placed within the heat-sealing unit.

The heat insulating portion of the apparatus may be any material which is stable at the temperatures required to effect sealing and which is an efficient heat insulator. Materials, such as mica, Mycalex, etc. may be employed. If cartridge type heaters are used, then the insulator need only exhibit thermal-resistance, whereas if a dielectric type of heating is used then the insulator must also be a high-frequency electric insulator.

The temperature at which sealing is effected will depend on the softening point of the material which is to be joined and will lie between the softening point and the decomposition temperature. Thus, when polytrifluorochloroethylene films were joined, a temperature between about 415° F. and about 510° F. was required for a period of time between about 1 second and about 10 minutes depending on temperature and pressure. The device described herein is particularly adapted to hand use. Pressures, therefore, may be as low as about 5 pounds per square inch gauge, although the principle involved may be used in high pressure techniques in which the device is one platen of a press and its use in this respect is contemplated. In a high pressure technique, pressures may be as high as 25,000 pounds per square inch gauge depending on thickness of the material and area of the sealing device.

In order to more clearly illustrate the present invention, reference will be made to Figures 1, 2, 3, and 4 of the drawings in which:

Figure 1 is a perspective view in diagrammatic form;

Figures 2 and 3 are cross-sections of Figure 1 and show the position of the heat-sealing device, with respect to the thermoplastic film that is being sealed, and after the sealing operation respectively;

Figure 4 is a modification of the device represented in Figure 1 of the drawing.

In Figure 1 of the drawing is portrayed, a heat conductive elongated body member 10 of rectangular cross-section having a cavity 11 longitudinally situated in the body member. A heat insulator 12 is attached on the upper face of the body member and is affixed thereto by means of screws through the heat insulator into a threaded portion of the body member. In order to provide a more efficient insulation, a number of layers of aluminum foil 13 are placed between the body member and the insulator, so as to provide air spaces. Other materials may be used in place of the aluminum foil such as mica and asbestos provided that they form air spaces. Heat insulating members of rectangular cross-section 15 and 16 are positioned along opposite faces of the body member 10 and are adapted so as to form a heat conductive surface between the heat insulating surface in a continuous plane. Heat insulators 15 and 16 are attached by screws, threaded into the body member. Aluminum foil insulation is also provided between the body member on the side heat insulators 15 and 16 at 17 and 18. Thermostat 20 is suitably positioned on the heat conductive body member and is so adapted as to control the temperature of the heat cartridges which are positioned in cavity 11. The device may be manipulated by means of handle 22 which is secured to the heat insulating body at the top of the device although other manipulative means may be employed.

Figure 2 of the drawing shows a cross-section of the device in position over a thermoplastic film which is sealed. The reference numerals of Figure 2 and the remaining figures correspond to those which were used with respect to Figure 1. In Figure 2 thermoplastic films 30 and 31 are butt-joined. A thermoplastic film 32 in the form of a tape having the same width as the width of the heat conducting body member, is placed over the butt-joint. The thermoplastic films are pressed against a suitable object 33 such as a steel plate and are sealed thereby.

Figure 3 of the drawing illustrates the position of the device and the thermoplastic films after the seal has been effected.

Figure 4 of the drawing represents a modification of the device described in Figure 1. In Figure 4, heat insulating body members are positioned within the body member so as to avoid protruding beyond the sides of the body member. The representation of Figure 1 is preferred, since the heat insulators are more readily maintained at a low temperature.

Employing the above described device, in which the heating block was aluminum and the insulating material Mycalex and in which the length of the device was 12 inches, the width of the heat block 1½ inches and the width of each of the insulators ½ inch, a thermoplastic polymer of trifluorochloroethylene approximately 5 mils thick was butt joined. A length of thermoplastic polytrifluorochloroethylene tape 1½ inches wide and 5 mils thick was positioned over the butt joint to form an overlap. The heat sealing device while at a temperature of about 420° F. was positioned over the overlap. Hand pressure was used. After the sealing device had been in contact with the material for about 3 seconds, the device was removed and the seam examined. A strongly bonded seam was observed, and the area adjacent to the seam was free of defects. By successively sealing 12 inch lengths, a butt seam approximately 6 foot in length was made.

While this invention has been described with reference to one particular type of thermoplastic and to one particular method of operation, it will be apparent that any thermoplastic material, such as polyvinyl chloride, polyvinylidene chloride, polytetrafluoroethylene, etc. may be substituted for the material described herein, and further that the shape or dimensional character of the sealing device may be modified to suit particular needs. Moreover, while the process of this invention was described with reference to the sealing of thermoplastic film, it will be apparent that laminates of thermoplastic materials for example on glass cloth and with or without fillers may also be sealed, provided that the thermoplastic components are brought in contact either directly or indirectly.

Various alterations and modifications of the present invention will become apparent to those skilled in the art without departing from the scope of this invention.

Having thus described our invention, we claim:

1. A device for heat-sealing thermoplastic polymers which comprises in combination a heat conductive elongated body member of rectangular cross-section having a longitudinal cavity in said body member, an electrical resistance heater positioned in said cavity of said body member, a thermostat located on said body member associated with said electrical heater and responsive to the temperature of said body member, elongated heat insulating members of rectangular cross-section having one face attached to opposite sides of said body member and so adapted as to form a confined heat conductive surface between said heat insulating members in a continuous plane.

2. A device for heat-sealing thermoplastic polymers which comprises in combination a heat conductive elongated body member of rectangular cross-section, means for heating said body member, means for controlling the temperature of said body member, elongated heat insulating members of rectangular cross-section having one face attached to opposite sides of said body member and so adapted as to form a confined heat conductive surface between said heat insulating members in a continuous plane.

3. A device for heat-sealing thermoplastic polymers which comprises in combination a heat conductive elongated body member of rectangular cross-section having a longitudinal cavity in said body member, an electrical resistance heater positioned in said cavity of said body member, a thermostat located on said body member associated with said electrical heater and responsive to the temperature of said body member, a first elongated heat insulating member attached to a face of said body member, a handle attached to said first heat insulating member, second and third elongated heat insulating members of rectangular cross-section having one face attached to opposite sides of said body member and so adapted as to form a confined heat conductive surface between said oppositely situated heat insulating members in a continuous plane.

References Cited in the file of this patent
UNITED STATES PATENTS

| | | |
|---|---|---|
| 2,289,618 | Young | July 14, 1942 |
| 2,433,176 | Van Epps et al. | Dec. 23, 1947 |
| 2,468,629 | Herzig et al. | Apr. 26, 1949 |
| 2,480,794 | Waggoner | Aug. 30, 1949 |
| 2,556,452 | Spalding | June 12, 1951 |
| 2,574,094 | Fener et al. | Nov. 6, 1951 |
| 2,577,570 | Eisenberg | Dec. 4, 1951 |
| 2,621,704 | Langer | Dec. 16, 1952 |